3,236,663
METHOD OF PRODUCING REFRACTORY BODY BONDED BY AN ALUMINUM NITRIDE-ALUMINUM BORIDE COMPOSITION
Carl A. Grulke, Berea, and James D. Ruggiero, Cleveland, Ohio, assignors to Union Carbide Corporation, a corporation of New York
No Drawing. Filed July 19, 1961, Ser. No. 125,064
2 Claims. (Cl. 106—56)

The invention relates to a refractory article which is bonded with an aluminum nitride-aluminum boride composition and to methods of making the same.

Refractory materials are those materials which are able to withstand exposure to high temperatures without undue chemical and physical change. Included among the desirable characteristics of these materials is an ability to resist a sudden change in temperature without cracking or deteriorating, a relatively high mechanical strength over a wide range of temperatures, resistance to corrosion and oxidation, and a density and hardness which varies with the specific use of the materials.

Such materials as titanium diboride, titanium carbide, silicon carbide, zirconium diboride, boron nitride, aluminum nitride, carbon and graphite are well-known refractory materials. Due to their refractory nature, particles of these materials are very difficult to bond together to form an article of a definite usable shape.

It is an object of the invention to provide a novel refractory composition which has unusual and distinctive properties.

It is another object of the invention to provide a novel bonding agent for refractory materials.

It is another object of the invention to provide novel methods of bonding refractory materials together.

It is a further object of the invention to provide methods of making refractory bodies having unusual and distinctive properties.

The above objects are achieved by the invention which comprises an article composed of particles of refractory materials bonded together by an aluminum nitride-aluminum boride composition. The invention also comprises the methods of making the same.

As taught in the co-pending U.S. application of C. A. Grulke, Serial No. 125,070 filed concurrently herewith, pure boron nitride may be made to react with aluminum to form a composition consisting of a continuous phase of aluminum nitride with inclusions of aluminum boride. As used herein, pure boron nitride means boron nitride having a purity by weight of at least 98%.

This reaction and the resulting composition are very effective for bonding particles of refractory materials, such as titanium diboride, boron nitride, graphite, silicon carbide, aluminum nitride, titanium carbide, zirconium diboride, carbon and the like. The article after bonding is composed of the particles of the refractory materials and a bonding phase substantially surrounding all these particles. The bonding phase is composed of a substantially continuous phase of aluminum nitride with inclusions of aluminum boride. Also, the bonding phase may contain inclusions of elemental aluminum. The finished article is refractory, and the quantities of materials in its composition can be varied to provide a variety of characteristics. Also, other materials may be added to further vary the characteristics.

The articles of the subject invention are made by blending pure boron nitride particles, particulate aluminum, and the desired amount of at least one particulate refractory material, molding the blend into a desired shape, and then firing the blend at between about 1375° C. and about 1500° C. in a reducing atmosphere for a time sufficient to produce a bond of aluminum nitride and aluminum boride, usually about one hour.

The amount of refractory materials in the blend can range from an effective amount, which need only be a trace, to about 90% by weight, and the relative weights of the purified boron nitride and the aluminum can range between about 1 to 1 and about 1 to 3 respectively. With the 1 to 1 ratio, a slight amount of boron nitride will remain unconverted, and with the 1 to 3 ratio there will be elemental aluminum remaining in the final article, i.e., about 35% of the weight of the bonding agent will be aluminum metal.

It is believed that the reaction of boron nitride with aluminum initially proceeds according to the following equation:

$$2BN + 3Al \rightarrow 2AlN + AlB_2$$

However, $AlB_2$ is unstable if the amount of aluminum present is limited. In such a case $AlB_2$ decomposes as follows:

$$AlB_2 \rightarrow \frac{1}{a} AlB_{2a} + \frac{a-1}{a} Al$$

wherein $a$ is an integer from 1 to 6 and depends upon the amount of aluminum available for reaction.

The aluminum freed by this decomposition can then react with the remaining boron nitride to start the process over again. The formation of aluminum nitride generally proceeds in accordance with the first equation.

The limiting reaction for the formation of $AlB_{12}$ by a combination of the above equations can be represented by the following stoichiometric balance:

$$2.83BN + 3Al \rightarrow 2.83AlN + 0.17AlB_{12} + 0.79B$$

The boron in the product of the above equation is believed to result from a dissociation of boron nitride when there is a limited amount of aluminum present. This equation has been substantiated by experiments, the results of which are shown in the co-pending application of C. A. Grulke discussed above.

In accordance with the above equations, the maximum and minimum weight ratios of aluminum nitride to aluminum boride in the final product of the reaction are respectively about 4.5 to 1 and about 1.6 to 1. The amount of aluminum present in the original mix determines the final ratio.

The method of producing these articles is illustrated more specifically in the following example.

*Example I*

Pure boron nitride was blended with a 3% addition by weight of a preliminary binder which consisted of a 1 to 1 mole ratio mixture of boric oxide and ethylene diamine. The blend was heated to about 300° C. in ammonia to react the boric oxide and ethylene diamine and thereby form the binder. The thus prepared powder was combined with finely divided aluminum and titanium diboride in a series of blends.

Each separate blend was then pressed at 16,000 p.s.i. at room temperature into blocks. In some instances, one drop of ethylene diamine was added per gram of boron nitride to improve the moldability. The pressed blocks were then fired in a 9 to 1 by volume argon-hydrogen atmosphere for about one hour at a temperature between about 1375° C. and about 1500° C. The initial blend composition and some physical properties of the product are shown in Table I:

TABLE I.—COMPOSITIONS AND PROPERTIES OF AlN-AlB$_x$ BONDED ARTICLES CONTAINING TiB$_2$

| Blend Composition, percent | | | Final Properties | | |
|---|---|---|---|---|---|
| BN | TiB$_2$ | Al | Apparent Density, g./cc. | Resistivity, ohm-cm. | Flexural Strength, p.s.i. |
| 50 | 0 | 50 | 1.70 | >1×10$^{10}$ | (¹) |
| 45 | 10 | 45 | 2.10 | 1,000,000 | (¹) |
| 33.5 | 33 | 33.5 | 2.30 | 2,600 | 16,800 |
| 25 | 50 | 25 | 2.42 | 30 | 8,010 |
| 5 | 90 | 5 | 2.62 | 0.0025 | 1,600, |
| 36 | 10 | 54 | (¹) | 1,500 | (¹) |
| 10 | 75 | 15 | (¹) | 0.00052 | (¹) |

¹ Not measured.

Examination of the internal structure of the final product by an X-ray absorption technique indicates that the aluminum boride is isolated by a continuous phase of aluminum nitride. The aluminum nitride phase also appears to surround the titanium diboride particles. As indicated by Table I, the electrical conductivity is a function of the percentage of titanium diboride particles. As indicated by Table I, the electrical conductivity is a function of the percentage of titanium diboride present. Although the insulating aluminum nitride phase is continuous, there seems to be sufficient particle to particle contact of titanium diboride to provide measurable conductivity.

The articles of the invention are suitable for use in the refractory field and in other fields which require the characteristics of the present compositions. Moreover, these articles can be used as electrical resistors and elements. For example, the instant compositions can be used to make electric igniters which are extremely durable and heat resistant. Such an igniter will ignite methane gas when the igniter is heated to about 950° C. by an electric current and will last almost indefinitely even though it is continually enveloped in a gas flame.

What is claimed is:
1. A method of producing a refractory body bonded by an aluminum nitride-aluminum boride composition, which method comprises mixing particulate boron nitride having a purity by weight of at least 98%, particulate aluminum metal, and at least one particulate refractory material, said refractory material constituting from an effective amount up to about 90% by weight of the mixture, and the weight of said aluminum metal being from about 1 to about 3 times greater than the weight of said boron nitride; molding the mixture into a desired shape; and firing the mixture at between about 1375° C. and about 1500° C. in a reducing atmosphere for a time sufficient to produce a bond of aluminum nitride and and aluminum boride.

2. The method defined in claim 1 wherein said refractory material is selected from the group consisting of boron nitride, titanium diboride, zirconium diboride, graphite, aluminum nitride, silicon carbide, titanium carbide, and carbon.

References Cited by the Examiner
UNITED STATES PATENTS 2,406,275  8/1946  Wejnarth _____ 106—45 XR
2,839,413  6/1958  Taylor _____ 106—55

JULIUS GREENWALD, *Primary Examiner.*
JOSEPH R. LIBERMAN, ALBERT T. MEYERS,
*Examiners.*